May 2, 1967 W. W. JOHNSON 3,316,670
MID-WATER TRAWL
Filed Dec. 24, 1964 3 Sheets-Sheet 1
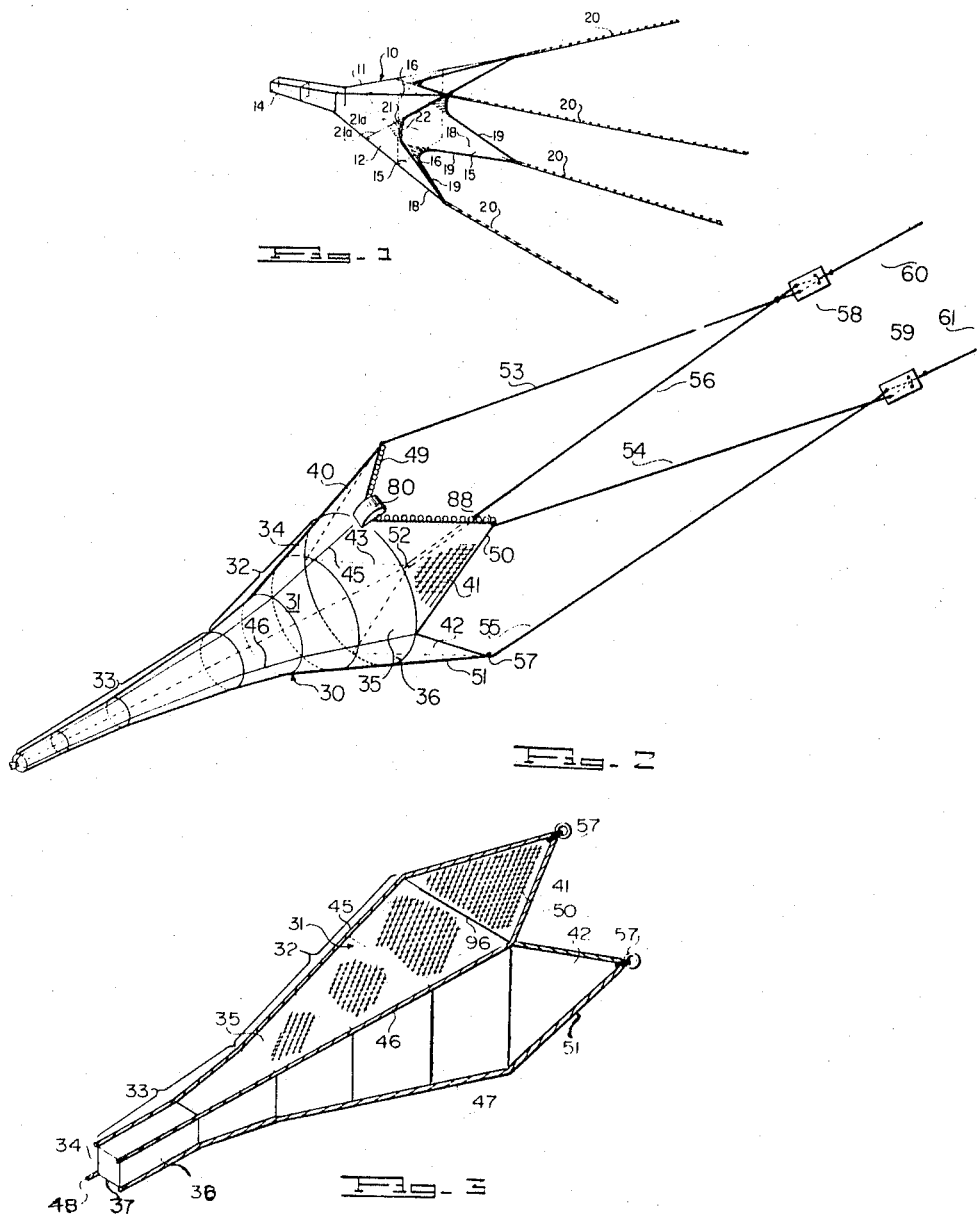
Inventor
Wesley W. Johnson
By Stevens, Davis, Miller, & Mosher
Attorneys May 2, 1967 W. W. JOHNSON 3,316,670
MID-WATER TRAWL
Filed Dec. 24, 1964 3 Sheets-Sheet 2
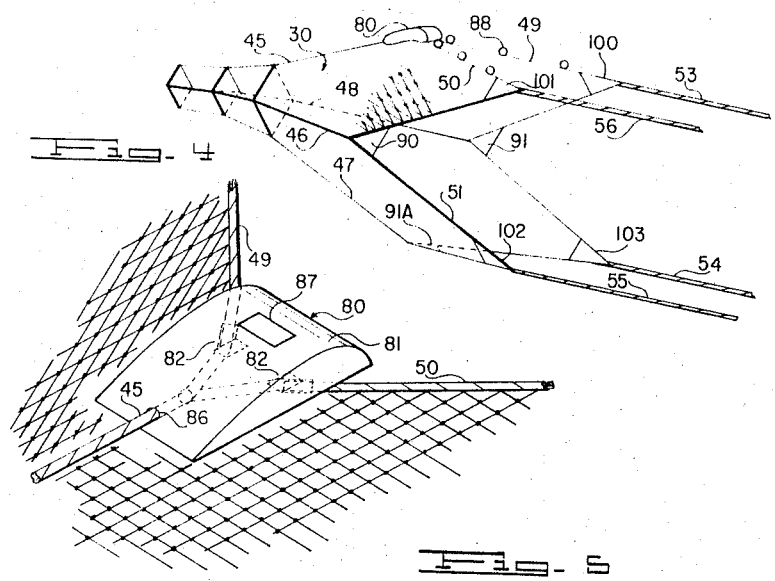
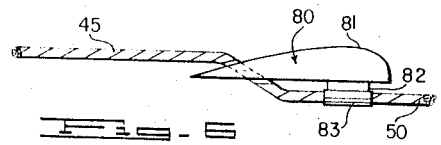
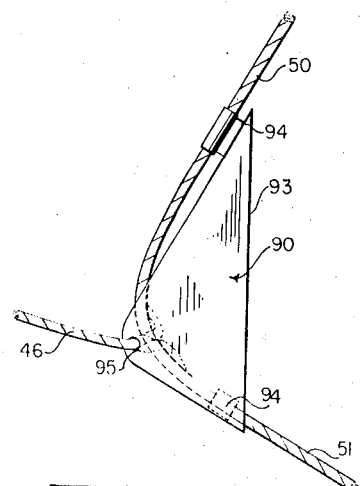
Inventor
Wesley W. Johnson
By Stevens, Davis, Miller & Mosher May 2, 1967 W. W. JOHNSON 3,316,670
MID-WATER TRAWL Filed Dec. 24, 1964 3 Sheets-Sheet 3

Inventor
Wesley W. Johnson

By Stevens, Davis, Miller & Mosher
Attorneys

United States Patent Office 3,316,670
Patented May 2, 1967

3,316,670
MID-WATER TRAWL
Wesley W. Johnson, Ottawa, Ontario, Canada, assignor to Canadian Patents and Development Limited, Ottawa, Ontario, Canada, a corporation of Canada
Filed Dec. 24, 1964, Ser. No. 420,881
9 Claims. (Cl. 43—9)

This invention relates to fishing trawls and more particularly to an improved mid-water trawl.

Known mid-water trawls have several serious disadvantages. One important disadvantage of known trawls is that the load is not evenly distributed to all the meshes at the mouth of the trawl. This uneven loading causes stress concentrations to be set up at certain points resulting in breaks or tears at these points. Preventive measures have been taken including providing reinforcing webs, diagonal rib lines and using large diameter twines in the body of the trawl. The inherent disadvantage of such reinforcing and large diameter twines, however, is that of increasing the visibility of the net thereby tending to warn the quarry. It is also believed that the increase in drag or resistance to passage of the trawl through the water tends to alarm the fish.

The reinforcing webs, rib lines and larger diameter twines increase the drag thus limiting the size of a trawl that can be effectively towed by a vessel of given horsepower.

One feature of the present invention is the provision of a trawl which allows a trawling vessel of a given horsepower to either tow a larger trawl or tow a trawl of comparable size at greater speed. Conversely a comparable size trawl could be towed with less horsepower.

Another feature of the present invention is the provision of a mid-water trawl which will overcome the above disadvantages by providing more even load distribution on the meshes at the mouth of the trawl.

A further feature is that of providing a greater fishing area for a given number of meshes than has heretofore been possible.

A further feature of the present invention is the provision of a trawl of simplified construction resulting in less time being required to assemble the trawl, a still further feature of the present invention is the provision of a trawl which permits the effective use thereof while reducing fouling of lifting, spreading and depressing devices.

The trawl of this invention may be generally defined as comprising a gradually tapered boxlike net having a body formed of two pairs of mutually opposed walls, said walls being bounded at side edges thereof by rib lines; a cod-end at the trailing end of said body portion; a triangular wing portion of net material extending from the leading edges of each of said four walls so that the base of each triangular portion extends along the entire leading edge of an associated wall of said body portion from rib line to rib line, the apex of each of the triangular portions being adapted to be secured to a sweep line.

In the drawings which accompany this application,

FIG. 1 is a perspective view of a known mid-water trawl;

FIG. 2 is a perspective view of a preferred embodiment of the mid-water trawl of this invention in its working configuration including the otter boards, sweep lines and other accessories;

FIG. 3 is an exploded view illustrating the manner in which the net is constructed;

FIG. 4 is a perspective view of the mid-water trawl of this invention including lifting depressing and spreading devices;

FIG. 5 is a fragmentary perspective view of a hydroplane for use with the trawl;

FIG. 6 is a side elevational view of the hydroplane of FIG. 5;

FIG. 7 is a perspective view of a spreading or depressing device for use with the trawl;

Figure 8:
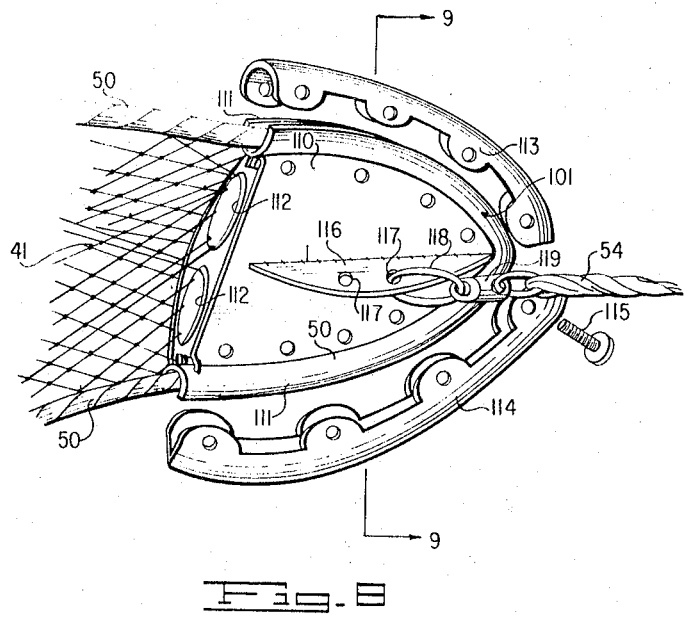
FIG. 8 is an exploded perspective view of a further spreading or depressing device.

Referring now in detail to the drawings, a conventional mid-water trawl net is shown generally at 10 in FIG. 1. A detailed description of the net 10 and associated gear may be found in Canadian Patent No. 608,969 issued Nov. 22, 1960 to the applicant and William E. Barraclough et al. Briefly, the conventional net 10 includes a tapered boxlike body 11 comprising four identical panels 12. A cod-end 14 is attached to the trailing end of the body 11. The leading edge of each panel 12 is provided with two triangular wing portions 15 and 16. Each of the triangular wing portions 15 is joined to a triangular wing portion 16 of an adjacent panel 12 along a common rib line 18. A sweep line 20 is connected to each rib line 18 at the apex of each of the wing portions 15 and 16. Head lines 19 extending along and secured to the free edges of wings 15 and 16 and along part of leading edge of panel 12 are also secured to sweep lines 20.

In order to offset stress concentrations occurring between the wing 15 and the wing 16 of the panel 12, reinforcing twines 21 are provided along what is known as the bosom line 22 or diagonal rib lines 21A are used.

It will be apparent from the following description how the present invention provides advantages over the conventional net 10.

In FIG. 2, a mid-water trawl in accordance with this invention is designated generally by numeral 30. The trawl 30 includes a gradually tapered net 31 having a body portion 32 and a cod-end 33 secured at the trailing edge of the body 32.

As shown more clearly in FIG. 3, the net 31 comprises two pairs of mutually opposed walls 34 and 36, constituting one pair and walls 35 and 37 constituting the other pair, all of net material. It will be noted, however, that the working configuration of the net 31 will be substantially as shown in FIG. 2, i.e. approximately frustro-conical. The adjacent side edges of the walls 34, 35, 36 and 37 are secured to common rib lines 45, 46, 47 and 48 of rope situated therebetween.

Four triangular wing portions 40, 41, 42 and 43 (see FIGS. 2 and 3) extend from the leading edges of the walls 34, 35, 36 and 37 respectively so that the base of each triangular wing portion extends along the entire leading edge of an associated one of the walls from rib line to rib line.

Head lines 49, 50, 51 and 52 advantageously of nylon covered wire rope, extend along, and are secured to, the free edges of the wing portions 40, 41, 42 and 43. The portion of the head lines 49–52 at the apex of the wing portions 40–43 are provided with eye splices 57 which are in turn adapted to be secured to sweep lines 53, 54, 55 and 56. The ends of the head lines 49–50 are secured to adjacent rib lines 45–48.

Turning again to the net proper, the four identical walls of the net 31, two of which are shown in greater detail in FIG. 3, comprises net material of different mesh sizes.

The body portion 32 can be constructed from one piece of net (not shown) or from multiple pieces of net of different mesh sizes and gauges. The cod-end 33 can be made of one, or a number of sections of different mesh sizes.

The cod-end 33 is provided with a zipper (not shown) to facilitate unloading of the catch described in detail in Canadian Patent No. 608,969 referred to above. The rib lines 45, 46, 47 and 48 to which the walls 34, 35, 36 and 37 are hung are preferably synthetic rope. However, it is possible to eliminate rib lines per se by lashing together some of the net material along side edges of a wall portion to form an integral rib line.

The wings 40, 41, 42 and 43, two of which are illustrated in FIG. 3, are generally seamed to the leading edge of the adjacent body net section. However, the wing portions may be made integral with the adjacent body portion.

It will be noted, however, that stress will be evenly divided among the meshes along a seam as at 96 at the base of the triangular wing portion 41. It is, therefore, possible to eliminate reinforcing such as is provided at 21 along the bosom line 22 of the conventional net illustrated in FIG. 1.

The trawl 30 may also include otter boards 58 and 59 as shown in FIG. 2. The sweep lines 53 and 56 are secured to the otter board 58 in a conventional manner. Similarly, sweep lines 54 and 55 are secured to the otter board 59. Towing warps 60 and 61 are connected to the otter boards 58 and 59 respectively and to a winch or winches located at the stern of the trawling vessel.

The trawl 30 when equipped with otter boards 58 and 59 may be towed by a single vessel or two vessels (not shown) may be used to tow a trawl having no otter boards.

Figures 9, 10:
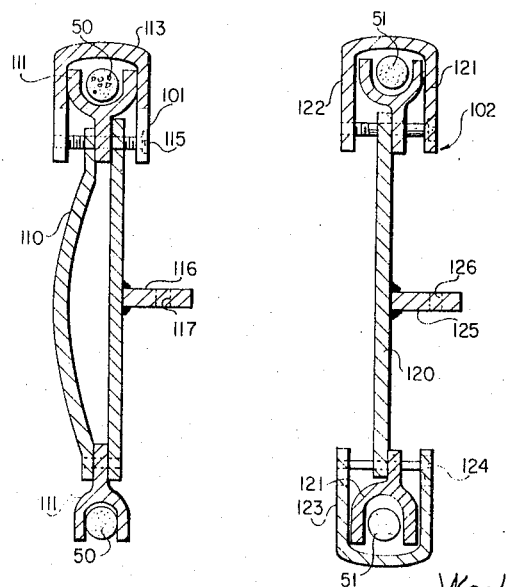
FIG. 9 is a section taken along the line 9—9 of FIG. 8 showing the device partially assembled.
FIG. 10 is a section similar to FIG. 9 of a modified spreading or depressing device.

The trawl net 30 of this invention is particularly adaptable for use with the lifting, depressing and spreading devices illustrated in FIGS. 4, 5, 6, 7, 8, 9 and 10.

In FIGS. 4, 5 and 6, a hydroplane 80 is secured to the headlines 49 and 50 and the rib line 45 of the trawl 30. The hydroplane 80 comprises a generally rectangular aerofoil shaped hollow body 81, which is substantially liquid tight to provide buoyancy. A pair of struts 82 having tubes 83 secured to the outer ends thereof are secured to the underside of the body 81 adjacent the leading edge. Each of the headlines 49 and 50 passes through an adjacent one of the tubes 83 and are secured to the rib line 45 which passes through aligned apertures 86 in the body 81.

If desired, a transducer (not shown) forming part of depth indicating apparatus may be inserted into the body 81 through an aperture 87 provided for this purpose.

As illustrated in FIGS. 2 and 4, a plurality of floats 88 may also be secured along two adjacent free sides of wing portions 40 and 41 to provide additional buoyancy.

In FIGS. 4 and 7, spreading devices 90 and 91 and depressing device 91A are secured to the net 30 at the leading ends of rib lines 46 and 48 respectively. As the spreading devices 90 and 91 are identical, only one need be described in detail. Accordingly, the spreading device 90 comprises a substantially triangular plate 93 having a pair of tubular struts 94 secured thereto adjacent the leading edge. The headlines 50 and 51 pass through the tubular struts 94 and are secured to the rib line 46 which passes through an aperture 95 in the plate 93 adjacent the apex thereof.

Wing tip spreaders 100, 101, 102 and 103, for use with the trawl 30, are illustrated in FIG. 4. As shown more clearly in FIGS. 8, 9 and 10, the top tip spreaders 100 and 101 provide buoyancy, whereas the tip spreaders 102 and 103 do not provide buoyancy. The top tip spreaders 100 and 101 are identical and, therefore, only spreader 101 will be described in detail with reference to FIGS. 8 and 9.

The top tip spreader 101 comprises a hollow substantially triangular body 110 formed of sheet material, preferably aluminum, a U-shaped channel member 111 is secured by suitable means such as by welding along two leading edges of the body 110 and is adapted to receive the headline 50. The trailing edge of the body 110 is provided with two elongated apertures 112 to which the net material of the leading portion of the triangular wing 41 is secured.

The headline 50 is secured in the channel member 111 by channel members 113 and 114 which fit over the channel member 111 and are releasably secured thereto by suitable means such as bolts 115. The bolts 115 pass through suitable aligned apertures in the channel members 113 and 114 and the body 111, and are secured therein by threaded engagement with the channel members 113 and 114 or by suitable nuts provided on the threaded ends of the bolts 115. It is important, however, that such nuts as well as the heads of the bolts be countersunk to prevent fouling of the net.

A rib 116 having one or more apertures 117 is secured to the outerside of the body 110, a ring 118 inserted through one of the apertures 117, is secured to a seine swivel 119 which is in turn connected to the upper sweep line 54.

The tip spreaders 102 and 103 (one of which will be described in detail) are similar to the top tip spreaders 100 and 101 with the exception that a single sheet of material such as aluminum forms the body 120 of the spreader 102. A channel member 121 secured to the body 120 receives the headline 51 which is retained therein by channel members 122 and 123 held in place by bolts 124. The trailing edge of the body 120 is adapted to be secured to the leading portion of the net material of the triangular wing 42 in the same manner as that of the body 110 described above. The body 120 is also provided with a rib 125 having at least one aperture 126 therein to which the sweep line 55 is secured in a manner similar to that of the sweep line 54, described with reference to FIG. 8.

In operation, the net having been set, the otter boards 58 and 59 (see FIG. 2) or other suitable means provide continued radial outward thrust to the wings 40, 41, 42 and 43, thus giving a maximum horizontal opening at the mouth of the net 31, as the net 31 is being towed. The top tip spreaders 100 and 101, the hydroplane 80 or other suitable means provides lift to the net 31 and to the upper sweep lines 53 and 54 to keep the net vertically open during towing. The floats 88 also serve to open the mouth of the net vertically upwardly, while a plurality of sinkers (not shown) or a suitable depressing device positioned along the bottom edge portion of the net mouth serve to open the net vertically downwardly. The tip spreaders 102 and 103 and the spreading devices 90 and 91 also provide radial outward thrust to the wings 42 and 43 and the net proper to open the mouth of the net 31.

After a suitable run has been made through the quarry, the towing warps 60 and 61 and the sweep lines 53–56 are wound on the drums of the winches. The otter boards 58 and 59 are brought to the surface and hung from the vessel so that the remainder of the sweep lines may be winched in. The cod-end is lifted aboard in the usual manner. If the catch is excessive, only a portion at a time is lifted aboard by means of a splitting strop (not shown).

I claim:
1. In a mid-water fishing trawl including a gradually tapered boxlike net having a body formed of two pairs of mutually opposed walls, said walls being bounded at side edges thereof by rib lines, and a cod-end at the trailing end of said body portion, the improvement comprising: a triangular wing portion of net material extending from the leading edge of each of said four walls so that the base of each triangular portion extends along the entire leading edge of an associated one of said walls from rib line to rib line, the apex of each of the triangular portions being adapted to be secured to a sweep line.

2. In a mid-water fishing trawl including a gradually tapered boxlike net having a body formed of two pairs of mutually opposed side walls, said walls being bounded at side edges thereof by rib lines, and a cod-end at the trailing end of said body portion, the improvement comprising a triangular wing portion of net material extending from the leading edge of each of said four walls so that the base of each triangular portion extends along the entire leading edge of an associated one of said walls of said body portion, from rib line to rib line, and head lines extending along and secured to the free edges of said wing portions and secured at their ends to adjacent rib lines, a portion of the head line at the apex of each of the triangular portions being adapted to be secured to a sweep line.

3. In a mid-water fishing trawl including a gradually tapered boxlike net having a body formed of two pairs of mutually opposed side walls, said walls being bounded at side edges thereof by rib lines, and a cod-end at the trailing end of said body portion, the improvement comprising a triangular wing portion of net material extending from the leading edge of each of said four walls so that the base of each triangular portion extends along the entire leading edge of an associated one of said walls of said body portion, from rib line to rib line, and head lines extending along and secured to the free edges of said wing portions and secured at their ends to adjacent rib lines, a portion of the head line at the apex of each of the triangular portions being secured to a sweep line, a pair of otter boards, means connecting two adjacent sweep lines to one of said otter boards, means connecting the remaining two sweep lines to the remaining said otter board and a tow warp connected to each said otter board.

4. In a mid-water fishing trawl including a gradually tapered boxlike net having a body formed of two pairs of mutually opposed side walls, said walls being bounded at side edges thereof by rib lines, and a cod-end at the trailing end of said body portion, the improvement comprising a triangular wing portion of net material extending from the leading edge of each of said four walls so that the base of each triangular portion extends along the entire leading edge of an associated one of said walls of said body portion, from rib line to rib line, and head lines extending along and secured to the free edges of said wing portions and secured at their ends to adjacent rib lines, a portion of the head line at the apex of each of the triangular portions being secured to a sweep line, a pair of otter boards, means connecting two adjacent sweep lines to one of said otter boards, means connecting the remaining two sweep lines to the remaining said otter board and a tow warp connected to each said otter board, and a hydroplane secured to the headlines of two adjacent wing portions and to the common rib line between said wing portions.

5. In a mid-water fishing trawl having a body formed of two pairs of mutually opposed side walls, said walls being bounded at the side edges thereof by rib lines, triangular wing portions of net material extending from the leading edge of each of said four walls so that the base of each triangular portion extends along the entire leading edge of an associated one of said walls and headlines extending along and secured to the free edges of said wing portions, a hydroplane comprising an aero-foil shaped hollow body and means for securing said body to the headlines of two adjacent wing portions and to the common rib line between said wing portions.

6. In a mid-water fishing trawl including a gradually tapered boxlike net having a body formed of two pairs of mutually opposed side walls, said walls being bounded at side edges thereof by rib lines, a cod-end at the trailing end of said body portion, a triangular wing portion of net material extending from the leading edge of each of said four walls so that the base of each triangular portion extends along the entire leading edge of an associated one of said walls of said body portion, from rib line to rib line, and headlines extending along and secured to the free edges of said wing portions and secured at their ends to adjacent rib lines, a spreading device comprising a substantially triangular body having a U-shaped channel in the leading edges of two sides of said triangular body to receive one of said headlines, means for retaining said headline in said channel, means for connecting said net material of said triangular portion to a trailing side of said triangular body and means for connecting said triangular body to a sweep line.

7. In a mid-water fishing trawl including a gradually tapered boxlike net having a body formed of two pairs of mutually opposed side walls, said walls being bounded at side edges thereof by rib lines, a cod-end at the trailing end of said body portion, a triangular wing portion of net material extending from the leading edge of each of said four walls so that the base of each triangular portion extends along the entire leading edge of an associated one of said walls of said body portion, from rib line to rib line, and headlines extending along and secured to the free edges of said wing portions and secured at their ends to adjacent rib lines, a spreading device comprising a hollow substantially triangular body having a U-shaped channel in the leading edges of two sides of said triangular body to receive one of said headlines, means for retaining said headline in said channel, means for connecting said net material of said triangular portion to a trailing side edge of said triangular body and means for connecting said triangular body to a sweep line.

8. In a mid-water fishing trawl including a gradually tapered boxlike net having a body formed of two pairs of mutually opposed side walls, said walls being bounded at side edges thereof by rib lines, a cod-end at the trailing end of said body portion, a triangular wing portion of net material extending from the leading edge of each of said four walls so that the base of each triangular portion extends along the entire leading edge of an associated one of said walls of said body portion, from rib line to rib line, and headlines extending along and secured to the free edges of said wing portions and secured at their ends to adjacent rib lines, a portion of the headline at the apex of each of the triangular portions being adapted to be secured to a sweep line, a spreading device comprising a substantially triangular body, the apex of which is adapted to be secured to a leading end of one said rib line and means for securing said triangular body to the headlines of two adjacent ones of said triangular wing portions.

9. In a mid-water fishing trawl including a gradually tapered boxlike net having a body formed of two pairs of mutually opposed side walls, said walls being bounded at side edges thereof by rib lines, and a cod-end at the trailing end of said body portion, the improvement comprising a triangular wing portion of net material extending from the leading edge of each of said four walls so that the base of each triangular portion extends along the entire leading edge of an associated one of said walls of said body portion, from rib line to rib line, and headlines extending along and secured to the free edges of said wing portions and secured at their ends to adjacent rib lines, a pair of spreading devices having triangular-shaped bodies, the apexes of which are secured to mutually opposed rib lines and means on each said spreading device for securing each said triangular body to the headlines of two adjacent ones of said triangular wing portions; a hydroplane comprising a hollow aerofoil shaped body secured to the leading end of a remaining one of said rib lines and to the headlines of two adjacent wing portions, and further spreading devices at the apexes of each of the triangular wing portions, each said further spreading device comprising a triangular body having a U-shaped channel in two leading side edges thereof to receive one of said headlines, means for retaining said headline in said channel, means for connecting said net material of said triangular wing portion to a trailing side edge of said triangular body and means for connecting said triangular body to a sweep line.

(References on following page)

References Cited by the Examiner

UNITED STATES PATENTS

| | | | |
|---|---|---|---|
| 1,800,270 | 4/1931 | Vigneron | 43—9 |
| 2,671,288 | 3/1954 | Larsson | 43—9 |
| 2,771,702 | 11/1956 | Breidfjord | 43—9 |
| 2,914,878 | 12/1959 | Persson et al. | 43—9 |
| 3,007,273 | 11/1961 | Eggertsson | 43—9 |

FOREIGN PATENTS

| | | |
|---|---|---|
| 608,969 | 11/1960 | Canada. |
| 223,305 | 10/1924 | Great Britain. |

SAMUEL KOREN, *Primary Examiner.*

WARNER H. CAMP, *Examiner.*